(12) United States Patent
Kerfoot

(10) Patent No.: US 7,156,984 B2
(45) Date of Patent: Jan. 2, 2007

(54) ENVIRONMENTAL REMEDIATION APPARATUS

(76) Inventor: William B. Kerfoot, 49 Ransom Rd., Falmouth, MA (US) 02540

(*) Notice: Subject to any disclaimer, the term of this patent is extended or adjusted under 35 U.S.C. 154(b) by 0 days.

(21) Appl. No.: 10/963,353

(22) Filed: Oct. 12, 2004

(65) Prior Publication Data

US 2005/0045544 A1    Mar. 3, 2005

Related U.S. Application Data

(62) Division of application No. 09/860,659, filed on May 18, 2001, now Pat. No. 6,805,798.

(51) Int. Cl.
*C02F 3/00* (2006.01)

(52) U.S. Cl. .................. 210/143; 210/150; 210/170; 210/205; 210/220

(58) Field of Classification Search ............. 210/143, 210/150, 170, 205, 220
See application file for complete search history.

(56) References Cited

U.S. PATENT DOCUMENTS

| | | | |
|---|---|---|---|
| 4,614,596 A | 9/1986 | Wyness | |
| 4,684,479 A | 8/1987 | D'Arrigo | |
| 5,167,806 A | 12/1992 | Wang et al. | |
| 5,205,927 A | 4/1993 | Wickramanayake | |
| 5,215,680 A | 6/1993 | D'Arrigo | |
| 5,221,159 A | 6/1993 | Billings et al. | |
| 5,427,693 A | 6/1995 | Mausgrover et al. | |
| 5,472,294 A | 12/1995 | Billings et al. | |
| 5,480,549 A * | 1/1996 | Looney et al. ............. | 210/610 |
| 5,525,008 A | 6/1996 | Wilson | |
| 5,698,092 A | 12/1997 | Chen | |
| 5,855,775 A * | 1/1999 | Kerfoot ..................... | 210/170 |
| 6,083,407 A | 7/2000 | Kerfoot | |
| 6,488,850 B1 * | 12/2002 | Perriello ................... | 210/605 |

FOREIGN PATENT DOCUMENTS

| EP | 03267196 | 11/1991 |
|---|---|---|
| GB | 2185901 A | 12/1985 |

OTHER PUBLICATIONS

Dowideit et al., "Reaction of Ozone with Ethene and It's Methyl . . . ", 1998, Environ. Sci. Technol., vol. 32, No. 8:1112-1119.
William B. Kerfoot, U.S. Appl. No. 09/610,830, filed Jul. 6, 2000.
William B. Kerfoot, "Soil Gas Movement—Monitoring Under . . . ", Remediation of Hazardous Waste Contaminated Soils, 1994:791-828.
Dahmani et al. "Laboratory Study of Air Sparging: Air Flow Visualization", 1993, GWMR:115-126.
Nelson et al., "Adapting ozonation for soil and groundwater cleanup", Chem. Eng., 1994:EE19-EE22.
Joseph Arthur Martone, "Sampling Submicrometer Particles Suspended in Near Sonic and Supersonic Free Jets of Air", *doctoral dissertation submitted to Oregon State University, Corvallis, OR,* pp. 117-124 (Jun. 1991).

* cited by examiner

*Primary Examiner*—Chester T Barry
(74) *Attorney, Agent, or Firm*—Fish & Richardson P.C.

(57) ABSTRACT

This invention relates to remediation systems, and more particularly to remediation systems for water, soil, and sediment bodies using thin-layer coated microbubbles.

10 Claims, 6 Drawing Sheets

FIG. 3

ENVIRONMENTAL REMEDIATION APPARATUS

"This application is a divisional application of Ser. No. 09/860,659 filed May 18, 2001, entitled "Environmental Remediation Method and Apparatus" now U.S. Pat. No. 6,805,798 Issued Oct. 19, 2004.

TECHNICAL FIELD

This invention relates to remediation systems, and more particularly to remediation systems for water, soil, and sediment bodies.

BACKGROUND

There is a well-recognized need for remediation, or cleanup, of contaminants (e.g. chemicals) that exist in a variety of settings, including ground and surface water, aquifers, water supply pipes, soil, and sediment collections. These settings are frequently contaminated with various constituents such as volatile organic compounds (VOCs). These contaminated areas pose a threat to the environment, and ultimately to the health and safety of all living creatures. Thus, equipment and methods for effectively and safely dealing with remediation of environmental contaminants is of significant importance.

SUMMARY

According to one aspect of the invention, a remediation process includes generating microbubbles comprising a gas, coated with a thin layer of liquid compounds suitable for promoting biological degradation of organic compounds.

According to another aspect of the invention, a remediation process includes generating microbubbles comprising a gas, coated with a thin layer of liquid compounds suitable for promoting chemical degradation of organic compounds and generation of microbubbles comprising a gas, coated with a thin layer of liquid compounds suitable for promoting biological degradation of organic compounds.

According to another aspect of the invention, a remediation process includes generating microbubbles comprising a gas, coated with a thin layer of liquid compounds suitable for promoting chemical degradation of organic compounds wherein the microbubble is coated by introducing a liquid as an aerosol to a gas, which mixture is forced through a microporous material, resulting in the coated microbubble, and contacting the coated microbubble with the area to be remediated.

According to another aspect of the invention, an apparatus for remediating a contaminated area using a liquid-coated microbubble including one or more gases includes an injection well and a source of a liquid suitable for promoting biological degradation of organic compounds. The apparatus also includes a source for delivering a gas, an aerosolizer for aerosolizing the liquid and a microporous diffuser disposed in the well for generating coated microbubbles of a controlled size comprising the gas and liquid liquid coating.

According to another aspect of the invention, an aerosol head includes a reservoir of liquid and a tube supply with compressed air. The head also includes a mixing chamber where the liquid is drawn into the flowing gas and a spray head which controls the particle size and distribution of the aerosols.

According to another aspect of the invention, a microbubble includes a gas, coated with a thin layer of liquid compound suitable for promoting biological degradation of organic compounds.

One or more aspects of the invention may include one or more of the following advantages. Thin-layer microbubbles with chemical or biological remediative characteristics, can be selected and engineered for particular remediation applications. The use of these coated microbubbles results in remediative processes wherein the microbubbles offer improved dispersion characteristics, improved reactivity characteristics, enhanced reestablishment of indigenous organisms in the treatment area, and broad applicability to a variety of treatment settings.

This invention relates to thin-layer coated microbubbles and their use, including remediation systems, and more particularly to remediation systems for water, soil, and sediment bodies. The remediation can be in the form of chemical reaction (i.e., degradation) of various contaminants or in the form of enhancing environmental conditions, or the food or nutrient supply, to indigenous organisms (e.g., bacteria) in order to promote their activity in remediating the contaminants or by-products of the contaminant remediation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 illustrates a microbubble apparatus as used in soil/groundwater applications.

DETAILED DESCRIPTION

Contaminants are any agent that directly, or indirectly, has a detrimental effect on the environment or a living creature (e.g., human, animal, insect, plant). Contaminants include volatile organic compounds, non-volatile organic compounds, polyaromatic hydrocarbons (PAHs) (e.g., anthracene, fluoranthene, phenanthrene, naphthalene); polychlorinated biphenyls (PCBs)(e.g., arochlor 1016); chlorinated hydrocarbons (e.g., tetrachloroethene, cis- and trans-dichloroethene, vinyl chloride, 1,1,1-trichloroethane, 1,1-dichloroethane, 1,2-dichloroethane, methylene chloride, chloroform, etc.); methyl tertiary-butyl ether (MTBE); and BTEX (e.g., benzene, toluene, ethylbenzene, xylenes, and the like); explosive residues (e.g., nitrobenzenes, RDX, trinitrotoluene (TNT), etc.); and chlorinated pesticides (e.g., chlordane, heptachlor, etc.). The microbubbles, apparatuses, and methods herein are useful in remediating contaminants, including any one, or combination of, those delineated herein.

Chemical reaction is any interaction between two or more chemicals resulting in a chemical change in the original reactants. The reactions may be oxidative or reductive in nature. The reaction can occur in any state, including the solid, gaseous, or liquid state or an interface thereof. The reaction can be enhanced (e.g., efficiency improved, reaction rate increased) by addition of one or more catalysts.

Biological reactions are any reaction that involves a biological process (e.g., bacterial metabolism, bacterial growth or proliferation). For example, in the processes delineated herein, certain organic compounds are subject to oxidative or reductive chemical degradation, resulting in lower molecular weight fragments or by-products. These by-products may be involved in bacterial metabolism such that they are "consumed" by the bacteria thereby undergoing a biological reaction or degradation. In other instances, the processes delineated herein provide nutrients (e.g., oxygen, nitrogen, carbon, phosphorous, potassium) such that bacterial growth, support, or proliferation can occur upon consumption of the nutrients. These are also considered biological reactions. Further, certain processes delineated herein using oxidative chemical reaction conditions, such as ozone, result in oxygen as a by-product (e.g., reduction of ozone to oxygen), which can act as feed for certain indigenous bacteria in the remediation area. Such enhancement of biological function, or bioremediation, is also considered within the scope of biological reaction.

Figure 1:
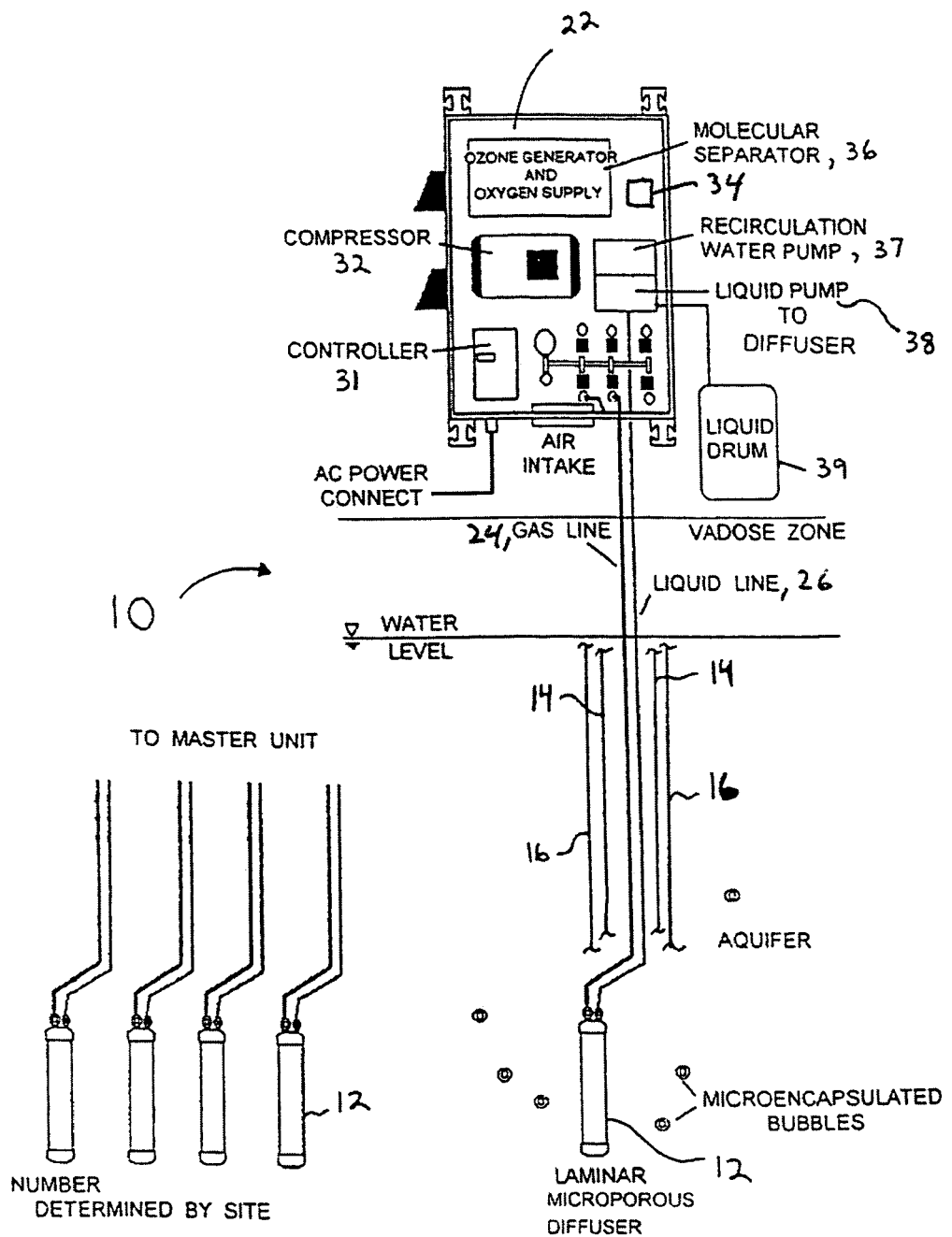
FIG. 1 is a schematic of a Criegee oxidizer and nutribubble system.

Referring to FIG. 1, injection well treatment system 10 includes microporous diffusers 12 disposed through an injection well to treat subsurface waters of an aquifer. The arrangement 10 includes a well 14 having a casing 16 with an inlet screen 18 (for embodiment shown in FIG. 2) and outlet screen 20 (for embodiment shown in FIG. 2) to promote a recirculation of water into the casing 16 (for embodiment shown in FIG. 2) and through the surrounding ground area. The casing 16 supports the ground and aquifer about the well. Disposed through the casing is the microporous diffuser 12. The injection well treatment system 10 includes master unit 22, which includes a controller 31, an air compressor 32, a compressor/pump control mechanism 34, and an ozone ($O_3$) generator 36. Microporous diffuser s 12 are in communication with master unit 22 by way of gas transfer line 24 and liquid transfer line 26, each of which is a pipe made of suitable material to accommodate transfer of the appropriate fluid to microporous diffusers 12. The air compressor 32 can feed a stream of air into the microporous diffuser 12 whereas the compressor pump control 34 feeds a stream of air mixed with ozone ($O_3$) from the ozone generator 36 into microporous diffuser 12 to affect substantial removal of contaminants. The treatment system 10 also includes a pump 38 that supplies a liquid decontamination agent such as hydrogen peroxide as well as nutrients such as biologically promotion agents, including carbon, nitrogen, phosphorous or potassium sources, from a source 39.

The system 10 can also supply catalyst agents such as iron containing compounds such as iron silicates or palladium containing compounds such as palladized carbon. In addition, other materials such as platinum may also be used.

The treatment system 10 makes use of a gas-gas reaction of contaminant vapors and ozone (described below) that can be supplemented with a liquid phase reaction. The use of hydrogen peroxide as a thin film coating on the bubbles promotes the decomposition rate by adding a secondary liquid phase reactive interface as volatile compounds enter the gaseous phase. It also expands the types of compounds that can be effectively removed. Alternatively, the pump control 38 can simply feed water. In addition, the biological nutrients can aid in the promotion of growth of bacteria to aid in bioremediation after treatment with ozone as described below.

Remediation using the equipment and techniques delineated herein can be performed to a variety of areas, including, for example, bodies of water (e.g., ground, surface, supply conduits including pipe systems), soil areas (saturated or unsaturated with liquids, e.g., water), and collections of sediments. A suitable area for remediation using the ozone/nutribubble technique is one in which the hydraulic conductivity of the geologic formation is between $10^{-1}$ and $10^{-6}$ cm/sec. In one embodiment, the remedial area is first treated with ozone/air microbubbles coated with hydroperoxide if necessary for specific bond cleavage or increase in oxidative potential. Ozone reacts in an aqueous and gaseous form to degrade aromatic ring compounds (BTEX) and certain ethers (MTBE). It also breaks apart long-chain aliphatic compounds. Following removal of BTEX/MTBE compounds, oxygen-enriched air bubbles are coated with a nutrient mixture and injected into the aquifer. The fine bubbles serve to assist in pumping the nutrients through the capillary structure of the formation being treated. The bubbles assist in removing $CO_2$ as well as supplying oxygen for respiration. Nutribubbles are any coated microbubble wherein the gas in the bubble, the thin-layer bubble coating, or combinations thereof, include a nutrient (e.g., oxygen, nitrogen, carbon source, phosphorous source), that is, a material that is useful for enhancement of the survival, growth, or proliferation of an organism, such as bacteria.

Introduction of the ozone/nutribubbles is accomplished by the microporous diffusers, which receive the simultaneous supply of gas and liquid. The pulsed injection of gas through the diffuser eliminates the common problem of plugging of injection wells. Pulsing refers to a systematic, or cyclic, sequence of injection of a material into the remediation area. For example, in the methods delineated herein, a sequence can be invoked wherein a treatment area is injected with the coated microbubbles delineated herein, followed by injection (or pumping) of water, followed by a rest period, whereupon the sequence is commenced again, and repeated in periodic cycles (e.g., 15–30 minute intervals). In this manner, a "pressure wave" is effectively produced that assists in dispersion of the microbubbles through the treatment area.

The injection well can be a monitoring well, where a microporous diffuser is placed to take advantage of the existing well.

Figure 2:
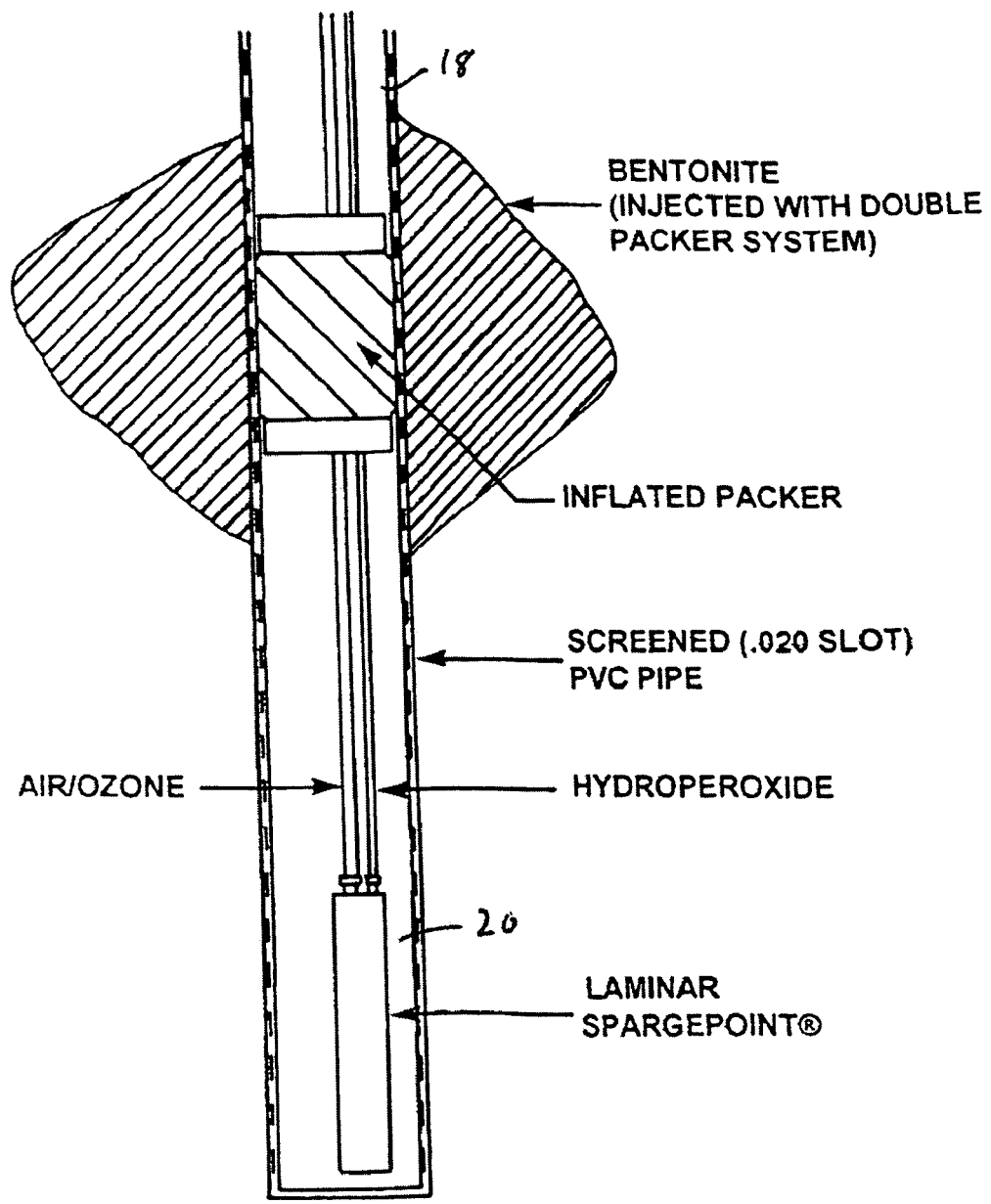
FIG. 2 illustrates an example of a monitoring well screen modified for laminar diffuser injections.

Referring to FIG. 2, a modified well screen having a laminar diffuser is illustrated. The modified well screen is comprised of screened PVC pipe having a 0.02 in. slot size with a inflated packer to produce an isolated portion of the well screen disposed between a microporous diffuser and upper portions of the well. Bentonite is disposed about the inflated packer. The microporous diffuser receives gas (e.g., air/ozone, nitrogen) and liquid (e.g., hydroperoxide or nutrients) in transfer lines otherwise using an apparatus similarly to that described in FIG. 1.

Figure 3:
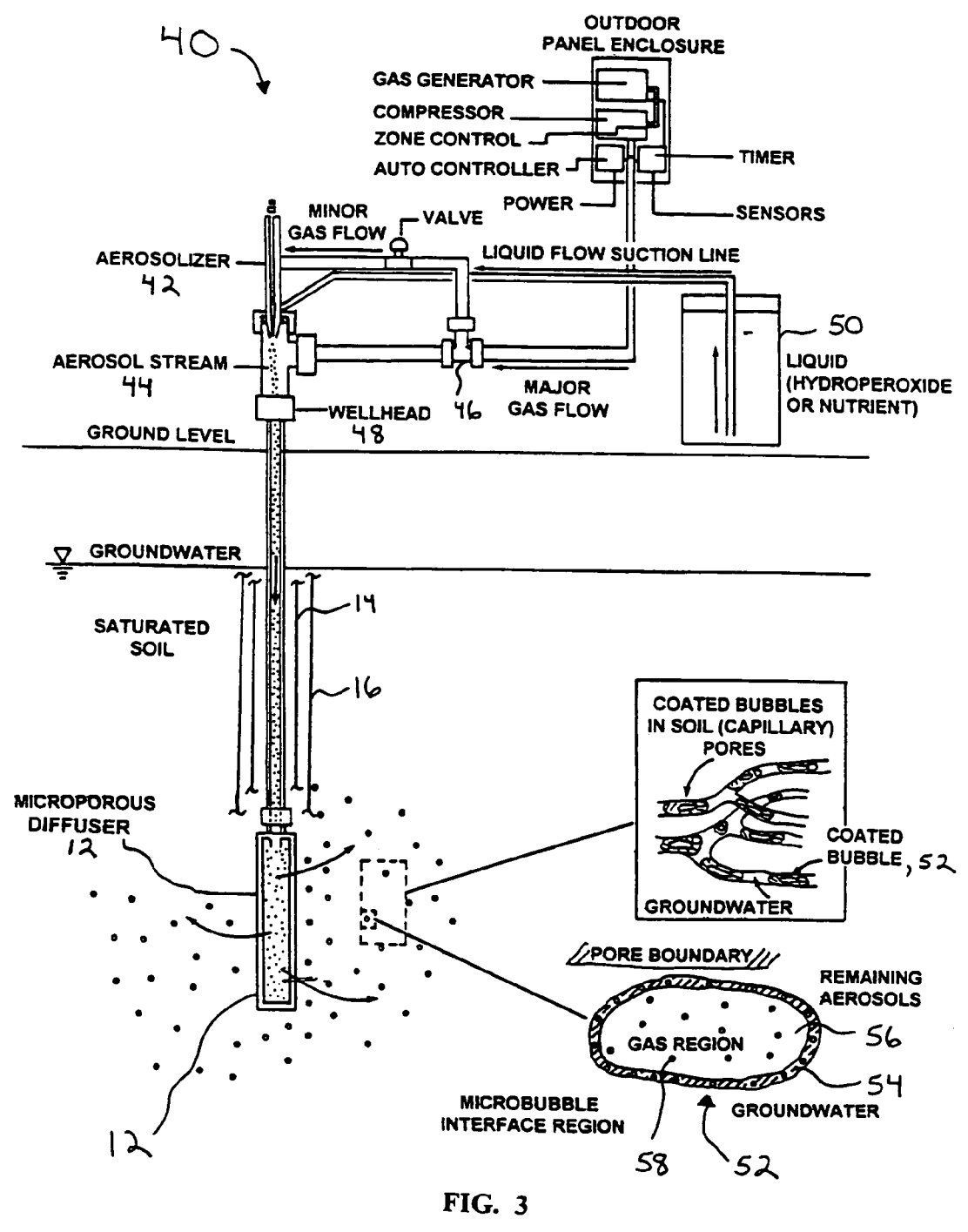

Referring to FIG. 3, an alternative microbubble apparatus 40 useful in soil/groundwater remediation applications includes an aerosolizer 42, a mixing chamber 44 and a T-junction 46. The apparatus 40 includes the elements of the system of FIG. 1 namely, microporous diffusers 12 disposed through an injection well 14. The well 14 has a casing 16 that can have an inlet screen (not shown) and outlet screen (not shown) to promote a recirculation of water into the casing 16 and through the surrounding ground area. The injection well treatment system 10 also includes an air compressor 32, a compressor/pump control mechanism 34, and an ozone (O3) generator 36. The compressor pump control 34 feeds a stream of air mixed with ozone (O3) from the ozone generator 36 into microporous diffuser 12 via through the aerosolizer 42 and the mixing chamber 44. A major portion of the liquid stream goes directly to the mixing chamber whereas a minor portion goes to the aerosolizer. The aerosolizer also receives a liquid steam of a decontaminant liquid e.g., hydrogen peroxide, or other liquid oxidizer and/or biological nutrients from a source 50. The mixing chamber 44 is coupled to the well head 48.

Still referring to FIG. 3, the coated microbubble 52 includes a gas region 56 surrounded by thin-layer coating 54. Aerosol particles 58 are dispersed within the gas region and within the thin-layer coating 54. Thin-layer coating 54 includes one or more components, such as oxidants, catalysts, acids, or nutrients. Upon leaving microporous diffuser 12, coated microbubbles 52 diffuse throughout the treatment area (e.g., aquifer, ground water, soil, sediment). For example, coated microbubbles 52 can travel through capillary networks (or pores) in the soil. Within the capillary networks, coated microbubbles 52 contact groundwater (in saturated soil) within the capillary network. Upon contact with the groundwater, the coated microbubbles 52 react with the organic chemicals (or other contaminants) in the groundwater, thus leading to degradation of the organic chemicals or contaminants. The coated microbubbles 52 can also diffuse in unsaturated soil capillary networks, where the pores are predominately gaseous containing.

Figure 4:
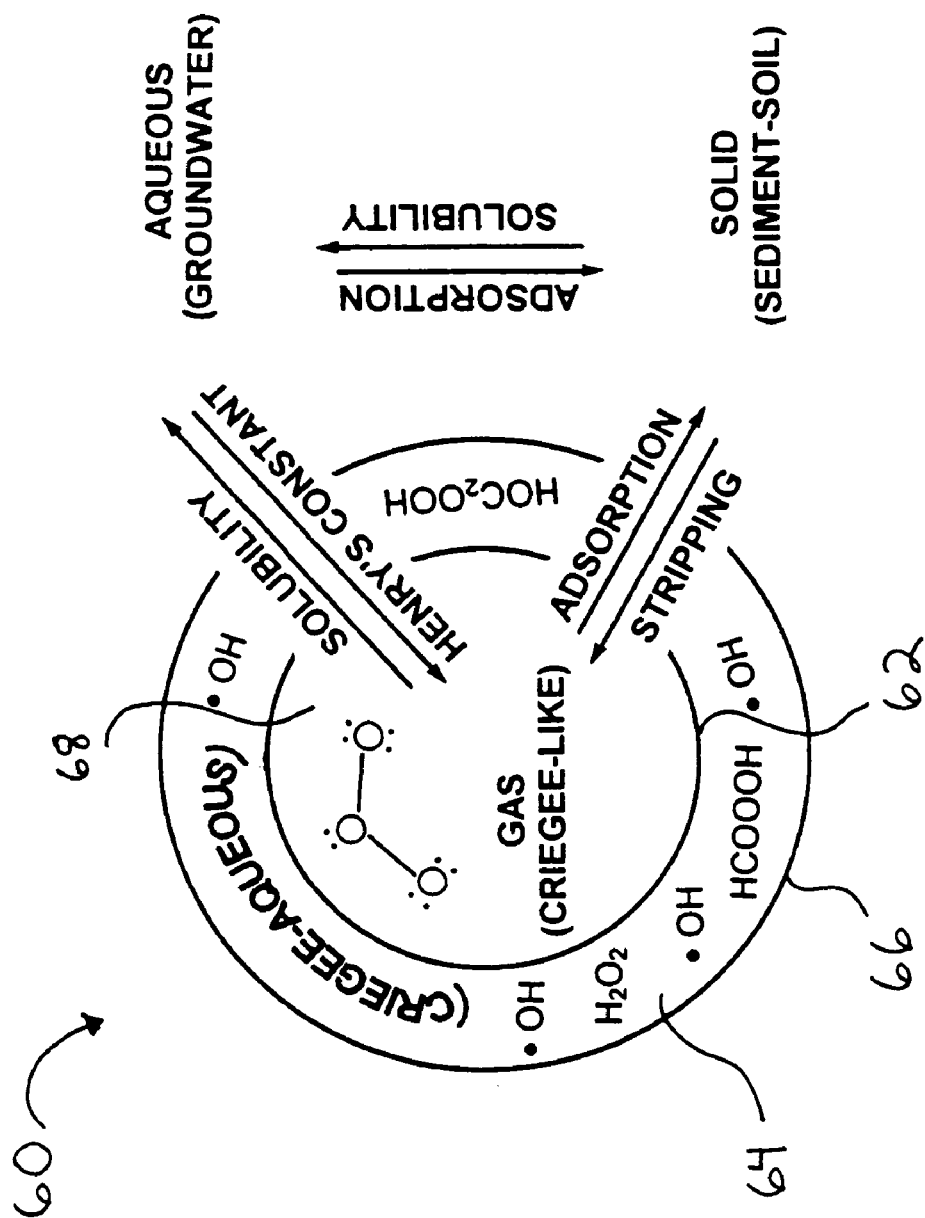
FIG. 4 is a schematic representation of a microbubble and processes within the microbubble.

Referring to FIG. 4, a schematic representation of a microbubble 60 is shown, wherein ozone is the gas and hydroperoxide is the liquid. The microbubble 60 has a gas region 68, and a thin-layer coating 64 defined by an internal interface 62 and an external interface 66. In ozone/hydroperoxide combinations, the gas region 68 includes ozone gas. Criegee-like oxidation processes occur at the interfaces of the thin-layer coating 64 such that the thin-layer coating can include both reactants (e.g., hydroperoxide) as well as Criegee oxidation by-products (e.g., hydroxide radicals, peroxy acids) resulting from the interaction of ozone and hydroperoxide. Thin-layer coating 64 advantageously provides for these reactants and by-products to remain in proximity to allow further reaction and to facilitate more efficient interaction of the reactants with the organic compounds or contaminants. The various partitioning effects of the solid-liquid-gas phases of coated microbubble 60 are also illustrated. For example, with respect to the microbubble, solubility (gas-aqueous partitioning) and its counterpart (aqueous-gas partitioning, governed by Henry's Constant) are processes relating to gas-aqueous phase interactions. Adsorption (gas-solid, liquid-solid) and its counterparts, stripping (solid-gas) and solubility (solid-aqueous) relate to gas-solid and liquid-solid partitioning processes. The interaction of these processes, both in the coated microbubble itself and through its interaction with the treatment area, contribute to the behavior, and advantages, of the coated microbubbles for remediation applications.

The introduction of ozone has an action similar to steaming of soils in reducing indigenous bacterial populations within 10 ft. (ca. 3 m) of the injection well, while additionally degrading organics to more readily attackable forms. Ozone also naturally decomposes to oxygen, theoretically supplying up to ten times the dissolvable oxygen content found with direct air injection. Oxygen-enriched air injection with nutrients purges the remaining ozone residual, allowing indigenous bacterial species capable of organic residue metabolism to quickly expand through the formation.

Figure 5:
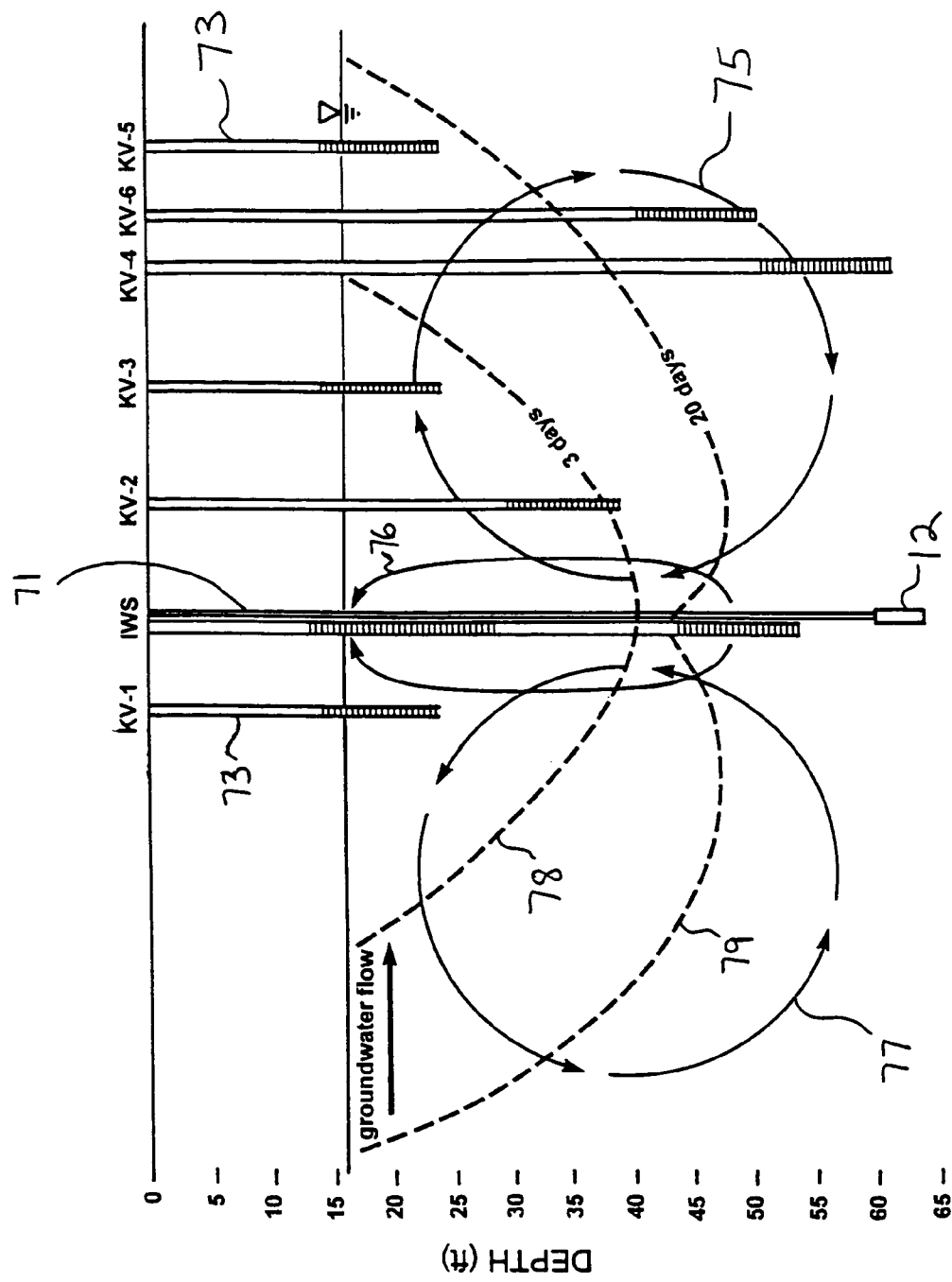
FIG. 5 illustrates one depiction of a zone of influence by dissolved oxygen change showing gyre formation around a microporous diffuser well due to mixing of microbubbles.

FIG. 5 illustrates an example of how coated microbubbles diffuse in a treatment area. In FIG. 5, injection well system 71, is a system similar to those described, for example, in FIG. 1 or FIG. 6 herein. It has a microporous diffuser 12 for release of the coated microbubbles. Monitoring wells 73 (depicted as KV-1, KV-2, KV-3, KV-4, KV-5, and KV-6) are used to monitor the products and by-products produced after coated microbubble treatment. Upon release of coated microbubbles into the ground, the coated microbubbles flow (and displace water in a similar flow pattern) in patterns depicted as flow patterns 75, 76, and 77. In this manner, mixing of the coated microbubbles in the treatment area occurs. Over time (e.g., 3 days, 20 days and so forth) these flow patterns result in oxidative reaction zones 78 and 79, respectively. These reactive zones are areas in which the coated microbubbles have caused more concentrated degradation due to more focused contact and reactivity. The dispersion of the coated microbubbles, however, is not limited to these reactive zones exclusively, rather the coated microbubbles are capable of flowing in all directions.

Figure 6:
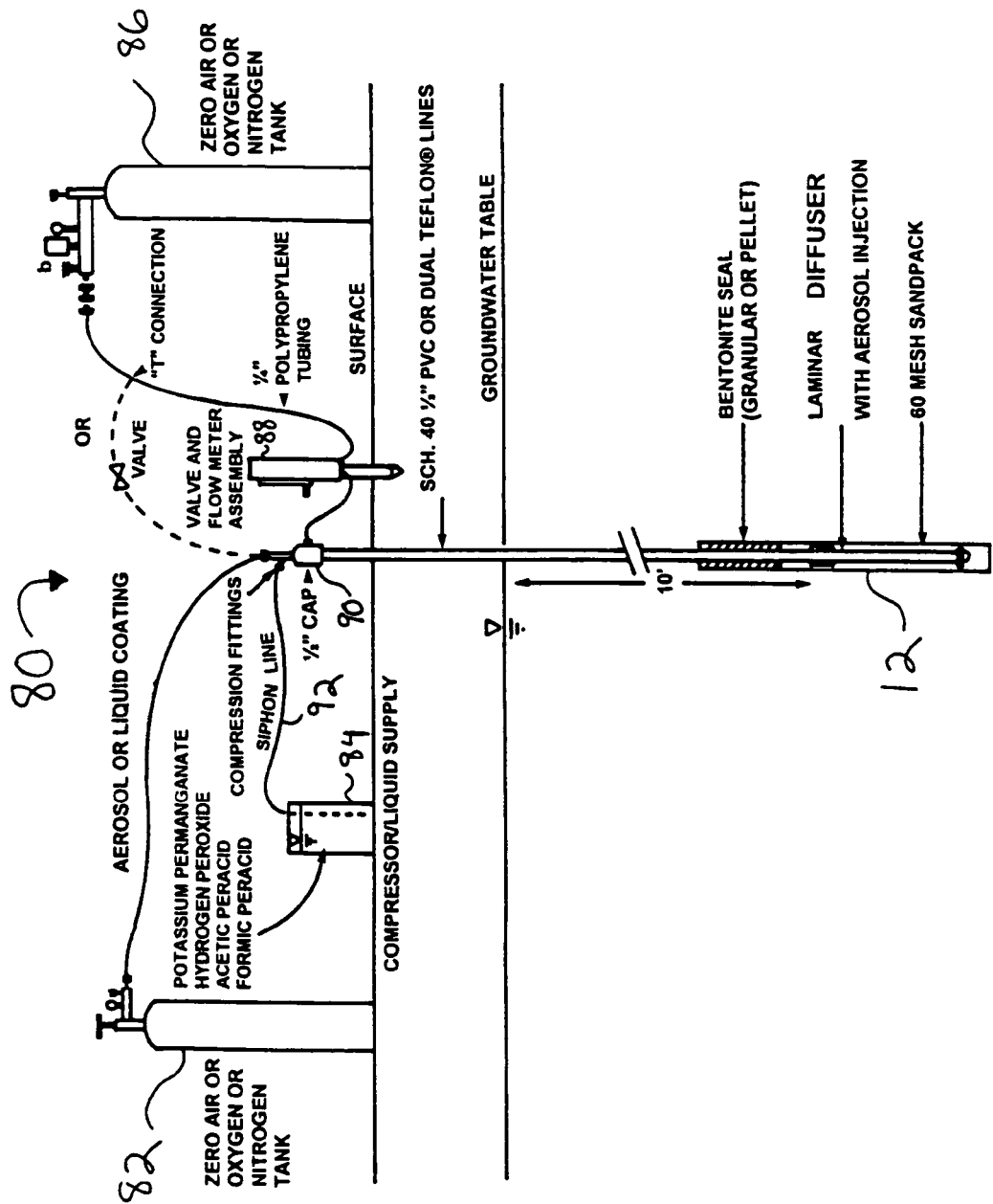
FIG. 6 illustrates an example of remediation using compressed gas tanks instead of compressors to supply gas in non-power sites.

FIG. 6 illustrates an example of how the injection well treatment system can be modified for non-power accessible sites. Well treatment system 80 includes elements of the system of FIG. 1, including microporous diffusers 12 disposed through an injection well 14. The liquid coating material is supplied by compressed gas tank 82 in communication with cap 90. Liquid supply 84 provides the coating materials (e.g., oxidants, catalysts, nutrients) via siphon line 92 to cap 90, which can be performed with or without application of pressure (i.e., with or without a compressor). A gas in compressed gas tank 86 is transferred via tubing through valve and flow meter assembly 88 to cap 90. The cap 90 is in communication with microporous diffusers 12 via gas and liquid transfer lines 22 and 24, respectively, and combination of the gas and liquid results in generation of coated microbubbles.

Microbiological degradation is a technique to degrade complex organic compounds. The rate of reaction depends upon the type of microbe, the substrate compound targeted as food, and the rate of gaseous exchange. Bubbling oxygen-enriched air through an aqueous solution of substrate compound, supplied with the nutrients nitrogen (N), phosphorus (P), and potassium (K), can encourage rapid metabolism and reproduction of microbes, which consume the organic compounds.

There are specific ratios of carbon (C), nitrogen (N), phosphorus (P), and potassium (K) to promote an efficient reaction. Often these reflect the molecular ratio of the elements in the growth of microbes and are used to expand the population numbers. During microbial degradation of the carbon compounds, oxygen is consumed and carbon dioxide ($CO_2$) is produced. If there is insufficient oxygen, the reaction will be self-limiting, abruptly slowing and eventually stopping.

The basic microbial process of biodegradation (aerobic) can be portrayed as a conversion of oxygen ($O_2$) to $CO_2$ and water plus more bacteria:

$$\text{Organic contaminant} \xrightarrow[O_2]{\text{bacteria}} CO_2 + H_2O + \text{more bacteria}$$

Whereas the reaction may proceed rapidly in vat or surface vessels, maintaining an efficient and continuous degradation is much more difficult in porous soils. Often evidence of natural biodegradation is shown by excess $CO_2$ in the overlying unsaturated soil zone (vadose zone) and low oxygen content in the saturated (aqueous) zone. The depletion of natural electron acceptors ($O_2$, $NO_3$, $SO_4$, Fe(III)), the depletion of natural electron donors (organic acids, e.g., acetate, lactate, $H_2$), the buildup of anaerobic metabolism gases such as $CO_2$, and the depletion of mineral nutrients ($NH_3$, $NO_3$, $PO_4$, K) regulate the rate of biodegradation.

The choice of oxidants can be used to tailor the remediation process for a selected class of chemical compounds, thus allowing one to design a remediation system for a particular application. This is accomplished by an analysis of the volatile organic compound to be remediated, taking into account its Henry's Constant value (see, Tables 1 and 2), which is an indicator of its proclivity to move from the liquid to the gaseous phase of an interface. By matching this transfer rate with that of the reactivity rate of a particular oxidant, the remediation process can be tailored such that the particular volatile organic compound is optimally reacted (and therefore remediated) relative to other volatile organic compounds present.

TABLE 1

Ideal for Ozone and Ozone/Hydroperoxide

| High Henry's Constants ($\geq 10^{-5}$) | Henry's Law Constant (atm-m$^3$/mole) |
|---|---|
| Benzene | $5.6 \times 10^{-3}$ |
| Benzo(a) pyrene | $1.1 \times 10^{-4}$ |
| Benzo(b) fluoranthene | $1.1 \times 10^{-4}$ |
| Bromodichloromethane | $1.6 \times 10^{-3}$ |
| Bromoform | $5.5 \times 10^{-4}$ |
| Bromomethane | $6.2 \times 10^{-3}$ |
| Carbofuran | $9.2 \times 10^{-5}$ |
| Carbon Tetrachloride | $3.0 \times 10^{-2}$ |
| Carbon Disulfide | $3.0 \times 10^{-2}$ |
| Chlordane | $4.9 \times 10^{-5}$ |
| Chloroethane | $6.2 \times 10^{-4}$ |
| Chloroform | $2.7 \times 10^{-3}$ |
| Chloromethane | $8.8 \times 10^{-3}$ |
| Chrysene | $9.5 \times 10^{-5}$ |
| 1,2 Dibromoethane (EDB) | $6.7 \times 10^{-4}$ |
| Dibromochloromethane | $8.7 \times 10^{-4}$ |
| 1,2-Dibromo-3-chloropropane | $1.5 \times 10^{-4}$ |
| 1,2-Dichlorobenzene | $1.9 \times 10^{-3}$ |
| 1,3-Dichlorobenzene | $3.3 \times 10^{-3}$ |
| 1,4-Dichlorobenzene | $2.4 \times 10^{-3}$ |
| Dichlorodifluoromethane | $3.4 \times 10^{-3}$ |
| 1,1-Dichloroethane | $5.6 \times 10^{-3}$ |
| 1,2-Dichloroethane | $9.8 \times 10^{-4}$ |
| 1,2-Dichloroethylene (cis) | $4.1 \times 10^{-3}$ |
| 1,2-Dichloroethylene (trans) | $9.4 \times 10^{-3}$ |
| 1,1-Dichloroethylene | $2.6 \times 10^{-2}$ |
| 1,2-Dichloropropane | $2.8 \times 10^{-3}$ |
| 1,3-Dichloropropene | $1.8 \times 10^{-2}$ |
| Dioxins | $5.6 \times 10^{-3}$ |
| Ethyl Benzene | $8.4 \times 10^{-3}$ |
| Fluorene | $1.0 \times 10^{-4}$ |
| Fluorotrichloromethane (freon 11) | $9.7 \times 10^{-2}$ |
| Heptachlor | $1.1 \times 10^{-3}$ |
| Heptachlor epoxide | $3.2 \times 10^{-5}$ |
| Hexachlorobenzene | $1.3 \times 10^{-3}$ |
| Lindane | $1.4 \times 10^{-5}$ |
| Methoxychlor | $1.6 \times 10^{-5}$ |
| Methyl isobutyl ketane | $1.4 \times 10^{-4}$ |
| Methyl ethyl ketone (MEK) | $2.7 \times 10^{-5}$ |
| Methylene chloride | $2.0 \times 10^{-3}$ |
| Monochlorobenzene | $3.8 \times 10^{-3}$ |
| n-Hexane | $1.4 \times 10^{-2}$ |
| Napththalene | $4.8 \times 10^{-4}$ |
| Polychlorinated biphenyls | $1.1 \times 10^{-3}$ |
| Pyrene | $1.1 \times 10^{-5}$ |
| Styrene | $2.8 \times 10^{-3}$ |
| 1,1,1,2-Tetrachloroethane | $2.4 \times 10^{-3}$ |
| 1,1,2,2-Tetrachloroethane | $4.6 \times 10^{-4}$ |
| Tetrachloroethylene | $1.8 \times 10^{-2}$ |

TABLE 1-continued

Ideal for Ozone and Ozone/Hydroperoxide

| High Henry's Constants ($\geq 10^{-5}$) | Henry's Law Constant (atm-m$^3$/mole) |
|---|---|
| Toluene | $6.6 \times 10^{-3}$ |
| 1,2,4-Trichlorobenzene | $1.4 \times 10^{-3}$ |
| 1,1,1-Trichloroethane | $1.7 \times 10^{-2}$ |
| 1,2,3-Trichloropropane | $3.4 \times 10^{-4}$ |
| Trichloroethylene | $1.0 \times 10^{-2}$ |
| Trifluralin | $2.6 \times 10^{-5}$ |
| 1,2,4-Trimethylbenzene | $5.6 \times 10^{-3}$ |
| Vinyl chloride | $2.7 \times 10^{-2}$ |
| Xylene (mixed o-, m-, and p-) | $7.0 \times 10^{-3}$ |

TABLE 2

Moderate Henry's Constants But Breakdown Products With High Henry's Constants

| | Henry's Constant |
|---|---|
| Dibutyl phthalate | $1.8 \times 10^{-6}$ |
| 2,4-Dichlorophenoxyacetic acid | $1.0 \times 10^{-8}$ |
| Di(2-ethylhexyl) phthalate | $3.6 \times 10^{-7}$ |
| 2,4-Dinitrotoluene | $1.3 \times 10^{-7}$ |
| 2,6-Dinitrotoluene | $7.5 \times 10^{-7}$ |
| Dinoseb | $4.6 \times 10^{-7}$ |
| Endrin | $7.5 \times 10^{-6}$ |
| Fluoranthrene | $6.5 \times 10^{-6}$ |
| Pentachlorophenol | $2.4 \times 10^{-6}$ |
| Phenol | $3.3 \times 10^{-7}$ |
| Pyridine | $8.9 \times 10^{-6}$ |
| Toxaphene | $6.6 \times 10^{-6}$ |

The rate of biodegradation in natural formations is very slow compared to above-ground settings. The ability to mix gases, electron donors, or nutrients with organic contaminates is limited by the porosity and hydraulic conductivity of saturated soils. Porous soils tend to encourage movement of liquids as slugs, not easily mixing with existing groundwater. The rate of natural movement is slow and determined by existing groundwater gradients. Velocities of natural flows commonly run 0.1 to 2 ft/day. The natural flow across a 100 ft wide contaminant zone may take 50 to 1000 days. The capability to remove product waste products is similarly hindered.

To address these issues, an efficient technique to provide reaction promoters and simultaneously to remove unnecessary products is desirable. "Food" in the form of carbon sources which provide energy (electron donors) is available in liquid form. Nutrients also can be mixed with "food" forms to assure ready availability of all required components for remediation conditions and organism growth enhancing environments. The presence of both as a coating to oxygen-enriched air provides bacteria with a very mobile nutrient system. In addition, gaseous products such as $CO_2$ can be transported away (i.e., displaced from the remediation area) as the gas rises. Microbubble technology provides the necessary attributes to meet these needs.

A microbubble can be "coated" by forcing microbubbles from less than about 200 microns, e.g., 0.5 to 200 micron size through a porous liquid stream in a diffuser, (e.g., a "laminated" Microporous Spargepoint® diffuser (Model Nos. SPT2000 and SPT2010), available from K-V Associates, Inc., Mashpee, Mass.) or by introducing aerosolized liquid particles into the gas stream supplying a diffuser. While not being bound by theory, generally, coatings made by forcing the microbubble through the liquid stream result in relatively thicker coatings caused, in part, by the thicker reaction points of the liquid forced through the gaseous phase in the diffuser. Conversely, those generated by the aerosol method result in microbubbles with relatively thinner coatings caused, in part, by the finer porous points of the liquid when introduced as an aerosol. Thicker coatings generally elevate the reactivity of the microbubble, particularly in oxidative reactivity. For example, thicker coatings of oxidative material is associated with increased Criegee oxidative capacity or oxidative potential (see, Dowideit and Sonntag, *Environ. Sci. Technol.* 1998, 32, 112–1119, incorporated by reference in its entirety), that is, the ability of the microbubble to break bonds of the chemical compound or contaminant subject to oxidative degradation. The thickness of a coating can be ascertained by techniques such as microscopic capillary analysis of the microbubbles with dyes (e.g., India ink), backlighting, or photoelectric cell detection methods.

The microbubbles can include a thin-layer coating having a material suitable for oxidative reactivity. So called, "high oxidative capacity" or "advanced oxidative" systems (e.g., using potassium or sodium permanganate, ozone in high concentrations, Fenton's reagent) are capable of particularly efficient chemical reactivity (e.g., bond breaking capacity, form, acids) can be incorporated into the microbubble to increase reactivity and degradation efficiency of the microbubble. Moreover, the methods of generating microbubbles allow for control of the stoichiometry of the chemical components in the microbubble, again allowing for the ability to tailor the microbubble to a specific profile for a desired application or reactivity By increasing the flow of liquid during the flow of gas, the thickness of the coating can be increased. The strength of oxidation capacity can be effected by increasing the concentration of hydrogen peroxide in the liquid phase as well as increasing the ozone content in the gas phase.

The size of the microbubble can also be varied by controlling the pressure of the gas during generation of the microbubble and by choice of the diffuser pore size. For example, by generating smaller coated microbubbles, the surface to volume ratio increases, which improves reactivity of the microbubble. Additionally, in instances where a coating thickness is held constant, a smaller coated microbubble effectively has a "thicker" coating relative to a larger coated microbubble, thus resulting in a coated microbubble with a "thicker" coating and greater surface area (relative to volume), which both contribute to increased reactivity (e.g., in oxidative coating applications, higher oxidative potential). Normally, the range of fluid to gas varies from parity (1:1) to about 1:100. This corresponds to a coating thicken of 0.3 (30%) increase in radius down to 0.01 (1%). Table 3 illustrates the relationship between gas and liquid volumes and variance in the coating thickness.

TABLE 3

Relationship of Microbubble Gas Volume to Liquid Volume with Change in Coating Thickness

| | Microbubble Size (mm) Radius Diameter | | | |
|---|---|---|---|---|
| | 1.0 mm (2000 micron) | .10 mm (200 micron) | .01 mm (20 micron) | .001 mm (2 micron) |
| Gas Volume | 4.189 mm³ (1 m³/day) | .00419 mm³ | .00000419 mm³ | .00000000419 mm³ |
| Liquid Volume (tenths of radius) | | | | |
| .05 | 660 mm³ (.157 m³/day) | 0.00066 mm³ | 0.00000066 mm³ | 0.0000000066 mm³ |
| .10 | 1.387 mm³ (.33 m³/day) | .00138 mm³ | .00000138 mm³ | .00000000138 mm³ |
| .20 | 3.049 mm³ (.73 m³/day) | .00305 mm³ | .00000305 mm³ | .00000000305 mm³ |
| Surface Area | 12.57 mm² | .1257 mm² | .001257 mm² | .00001257 mm² |
| Surface-to-Volume Ratio | 3 | 30 | 300 | 3000 | carbon-containing compound reactivity) useful in contaminant degradation processes. These reactions are characterized in that they have oxidation potentials in excess of 2.0 (based on electrochemical reactions at 25° C.).

The microbubbles delineated herein are advantageous in that they can be designed to optimize their suitability for certain applications in remediation technology. For example, the microbubbles can be formed and shaped in the various manners described above (e.g., using a microporous diffuser, or aerosolized liquid and a microporous diffuser). Depending on their size and thickness, certain reactivity profiles can be achieved. Additionally, the composition of the gas in the bubble, as well as the type of liquid coating selected can be chosen to accomplish various oxidative or reductive degradation profiles, and catalysts (e.g., metals in microparticle Microbubbles can also be selected according to a controlled size using a layered fine bubble production chamber. The layered fine bubble production chamber is a chamber in which a liquid is placed under pressure and microbubbles are generated. That is, over a period of time, an environment is provided where the microbubbles segregate by size (e.g., larger microbubbles rise and smaller microbubbles remain) thus allowing a mixture predominated by a particular microbubble size (or size range) to be established prior to injection into the treatment area. This is suitable for use, for example, where smaller microbubbles may be desired (i.e., for their higher surface to volume ratio).

One example of such control relates to the "Law of the Minimum", which states that bacterial growth will stop when the nutrient that was present in the lowest concentration (relative to the requirement) is exhausted, becomes a problem since the rest of the mixture is useless. If that substance is replenished, growth will stop when the next substance is exhausted. By providing a means of ready mixing of the constituents and having the capacity to modify the electron accelerator and nutrient ratios, using metabolic products as a guide (e.g., monitoring by-products formation in real time by sampling via a monitoring well and analyzing the samples using, for example, gas chromatography or other suitable analytical technique), the rate of metabolism can be adjusted and maximized. In another embodiment, the methods herein can be applied such that an existing monitoring well can be used as an injection well for the microbubble diffuser.

Microbubbles form a unique physical and chemical environment which can effectively treat waterborne or attached (adsorbed) volatile organic compounds (VOCs). Diffusers, or spargers, placed in groundwater or saturated soil provide extremely small "microbubbles" with a very high surface area to volume ratio. This high surface area to volume ratio maximizes the VOC transfer from the liquid phase to gas phase. If the air bubbles are filled with an oxidizing gas, like ozone, the VOCs react with the ozone and are destroyed while still in the water column. This "in-situ" combined VOC recovery and destruction not only obviates the need for an additional process step but also enhances the physical and chemical kinetics of the process.

Microporous diffusers suitable for use in the methods described herein are those having the ability to deliver a gas and a liquid such that microbubbles less than about 200 microns, preferably between about 0.5 and 200 microns, are produced including the gas therein and a thin layer of the liquid material coating the microbubble. The diffuser can be constructed of a variety of materials suitable for the gases and liquids to be delivered, such materials include, for example, stainless steel, high-density polyethylene (HDPE), low-density polyethylene (LDPE), polyvinyl chloride (PVC), polytetrafluoroethylene (PTFE, e.g., TEFLON), acetal (e.g., DELRIN), or polypropylene. The diffuser can include concentric tubes of microporous material, optionally having additional packing materials (e.g., hydrophobic plastics, hydrophilic plastics, beads, interconnected fibers) sandwiched between the tubes to facilitate creation of the gas-liquid interface in the microbubble. These materials aid the liquid coating process of the gas flowing through the diffuser in the generation of microbubbles, in part by their hydrophilic or hydrophobic nature to enhance coating, and in part by their ability to increase the positioning of the liquid to optimize contact with the gas flowing through. Examples of diffusers suitable for use in the methods delineated herein include the laminar microporous SPARGEPOINT® diffuser or the C-SPARGER® diffuser (both available from K-V Associates, Inc., Mashpee, Mass.).

Aerosols or aerosolized liquid particles are one method by which coated microbubbles can be formed. The aerosolized particles are produced using an aerosolizer (see, FIG. 3), including any apparatus suitable for providing an aerosolized form of a liquid (e.g., a commercial airbrush Badger 150). The aerosolized liquid particles can be any suitable for use in the coating application (i.e., chemical or biological reaction) and remediation process of interest, including for example, oxidants (e.g., hydroperoxides, potassium permanganate, Fenton's reagent (hydrogen peroxide and Fe(II))), catalysts (e.g., as delineated below), acids, (e.g., acetic, lactic), and nutrients (e.g., as delineated below).

The aerosol can be generated using an aerosol head including a reservoir of liquid or liquid and microfine particles mixture; a siphon tube made of e.g., TEFLON or resistant flexible plastic; a tube supply with compressed air; a mixing chamber where the liquid is drawn into the flowing gas; a spray head which controls the particle size and distribution of the aerosols; and a compression fitting which directs the aerosol flow into the air/ozone gas stream. The mixing chamber can be, for example, a Bernoulli chamber, that is, any chamber that (in accordance with Bernoulli's principle) is capable of compressing a fluid through a narrower opening into a larger chamber resulting in a variance in pressure. The aerosol head can further include connecting tubing such as TEFLON tubing ⅜" to ½" in diameter, polyvinyl chloride tubing ½" to 1" in diameter, with o-ring seals (e.g., VITON) and threaded 5 ft. sections. The aerosol head is in communication with the microporous diffusers, in a manner to maintain a sufficient rate of gas flow to avoid condensing of the aerosol flow. The aerosol spray head can e adjustable to vary the liquid flow feed rate from between about 1/10 to 1/10,000 of the flow of the air/ozone volume flow. Also, the aerosol flow can be introduced continuously with the air/ozone flow.

Catalysts are any material that is useful in catalyzing the desired chemical transformation or process to promote quicker or more efficient reaction. The catalysts are presented as micron-sized particles to augment the interface region of the microbubble. For example, transition metals including palladium (Pd), manganese (Mn), and iron (Fe), in elemental or salt forms; sulfur compounds including sulfates and sulfides.

Additionally, the acidity of reactions processes can be modified to enhance reactivity, and therefore the remediation processes herein. For chemical reactions (i.e., remediation processes) that are more effective under lower pH conditions (i.e., acidic, pH less than 7) the microbubbles can be coated with an acidic coating, thus, lowering the pH of the interface and increasing the reaction rate and efficiency of the remediation process. The acid can also be incorporated in a coating having other liquids in it where beneficial (e.g., increased reactivity, efficiency) chemical effects can be realized, for example, acid and iron (II or III) salts (e.g., Fenton's reagent), which in combination can catalyze the oxidative reactivity of the coated microbubble. This is advantageous in soil aquifers, where it is impractical to acidify the entire aquifer, and is also useful in reactions and remediation processes involving halocarbon contaminants.

The gases useful in the microbubbles are any that are suitable for chemical or biological reaction and remediation. For example, in oxidative applications, ozone, oxygen and air are suitable gases. In reductive applications, nitrogen or hydrogen can be used. The gas suitable for an application is dependent, in part, on criteria such as the reaction desired, or the bacterial growth requirements (aerobic or anaerobic). The gas can be generated in situ (e.g., ozone generator), provided using a compressor, or provided via compressed tanks (e.g.,.

Nutrient coatings on the microbubbles are any suitable nutrient for bacterial (aerobic or anaerobic) growth. Such nutrients include, for example, carbon sources (e.g., carbohydrates, sugars, beer, milk products, methanogens, organic acids such as acetic and lactic acids, organic esters such as acetates, proprionates, organic ketones such as acetone), nitrogen sources (e.g., ammonia, nitrates, ammonium nitrate), phosphorous sources (e.g., soluble phosphates, etc), and potassium sources (e.g., 10,000 ppm of lactate; 680 ppm $NH_4NO_3$; 200 ppm $KH_2PO_4$ to provide sources of carbon and nitrogen, and phosphorus and potassium). Generally, environments suitable for bacterial support and growth are made up of the nutrients in the following relative ratios: carbon (ca. 1000 parts), nitrogen (ca. 150 parts), phosphorous (ca. 30 parts), sulfur, potassium, and sodium (ca. 10 parts each), calcium, magnesium, and chloride (ca. 5 parts each), iron (ca. 2 parts), and any remainder elements in trace amounts, with the ratios based on molar equivalents, which may be in the form of either elemental or ionic (i.e., salt) forms, or a combination thereof.

Advantageous aspects of the invention include: 1) gas/liquid thin-layer microbubble oxidation to predigest and sterilize around injection locations; 2) simultaneous injection of nutrients and food source with gas in proportion to optimal ratio for assimilation; 3) injection of nutrients to provide a coating (thin layer) on gas (oxygen-enriched air) being injected into porous soil capillaries; 4) introduction in a pulsed manner with microbubbles of 5 to 100 micron diameter sized to pores of soil to avoid fracturing of soil and to enhance transport through capillary-like soil voids; 5) use of microporous diffusers (e.g., Spargepoint®) or aerosolized liquids and microporous diffusers for simultaneous introduction of gas and liquid mixtures into coated microbubbles engineered for specific characteristics (e.g., size, shape, reactivity, composition).

In order that the invention described herein may be more readily understood, the following examples are set forth. It should be understood that these examples are for illustrative purposes only and are not to be construed as limiting this invention in any manner. All references cited herein are expressly incorporated by reference in their entirety.

EXAMPLES

Bench-scale tests were conducted on soil samples collected from a site located in Paterson, N.J. and augmented with PCBs (e.g., arochlor 1260). The purpose of the tests was to evaluate the response of volatile organic compounds and semi-volatile organic compounds contained in soil aliquots extracted from these soil samples to an aqueous environment containing various injected concentrations of sparged air with ozone or sparged air with ozone plus varying concentrations of injected hydrogen peroxide. During each test, treated and untreated aqueous samples were collected from the test cell at regular time intervals and field screened with portable gas chromatograph for ionizable compounds. Prior to, and following each test, soil and groundwater samples were collected from the test cell for confirmatory laboratory analyses.

Testing Procedure

Initial bench-scale testing included putting approximately 5 grams of soil sample in a 40 ml VOA vial with 30 ml of water and allowing headspace to develop, then screening the headspace in an HNu Systems Model 321 portable gas chromatograph. The purpose of this step was to extrapolate the volume of soil necessary to produce an instrument response in the GC that was noticeable for further testing.

Subsequent testing included stirring approximately 40 grams of soil sample in 500 ml of water contained in an Erlenmeyer flask and subjecting the entire solution to sparged air containing approximately 100 ppmv of ozone. This test was conducted under 0 psig with aqueous samples collected from the test cell at time intervals of 0, 2, 5, 10, 15, and 20 minutes and field screened with portable gas chromatograph for ionizable compounds.

Following the above preliminary bench-scale tests, further testing was conducted in a larger glass volume container to allow for split sampling of soil and groundwater samples to a certified laboratory for confirmatory analyses. This test cell included mounting a stopper on the 1,000 ml container and drilling holes in the stopper to allow for various tubing diameters to pass through the stopper to accommodate: an external pressure gauge T'd with a pressure relief valve; a sample guideport to permit below-water-level aqueous sampling; a gas line for a mini-laminate Spargepoint® (1.5 inch in height and 1.5 inch in diameter); and injection of treatment liquids such as a 3% solution of hydroperoxide or peracid precursor.

The following four bench-scale tests were all conducted under 5 psig. Split groundwater samples were collected at the beginning and end of each test run and sent to a Massachusetts state-certified laboratory for volatile organic analysis. Soil samples were collected at the beginning of each test run and sent to a Massachusetts state-certified laboratory for volatile organic analysis. Soil samples were collected at the beginning of each test run and sent to a Massachusetts state-certified laboratory for volatile and semi-volatile organic analysis. A soil sample was collected at the end of each test run and sent to a Massachusetts state-certified laboratory for semi-volatile organic analyses.

Results

The soil samples appeared to contain weathered oil as well as other organic compounds. Review of the portable gas chromatograms indicate the nearly complete attenuation of ionizable compounds by the end of each test run. The last set, using a 300 ppmv ozone concentration and 2 ml/min hydroperoxide, gave the lowest baseline response of the four treatments. The introduction of hydroperoxide with ozone as a bubble coating appeared superior in treatment than a batch mixing with an added slug of equivalent volume.

A final additional test set was performed by increasing the oxidant concentrations to 300 ppmv ozone with 10 ml 10% hydroperoxide and 3000 ppmv with 30 ml 10% hydroperoxide as a bubble coating. The results of the test are presented in Table 4. After oxidation, the nutribubble introduction was started and continued until remaining concentrations drop below 10 µg/kg.

TABLE 4

Removal of PCBs and PAHs from contaminated sediment by ozone plus hydroperoxide, introduced as bubble coating, 30-minute bench-scale test.

| Compound | Initial Concentration (µg/kg) | Ozone + Hydroperoxide | | % Removal |
| --- | --- | --- | --- | --- |
| | | 300 ppmv + 10 ml 10% | 3000 ppmv + 30 ml 10% | |
| Arochlor 1260 | 23,300 | 3,900 | 5,000 | 79 |
| Naphthalene | 21,000 | 750 | 650 | 97 |
| 2-Methylnaphthalene | 13,000 | 710 | BRL | 99 |

TABLE 4-continued

Removal of PCBs and PAHs from contaminated sediment by ozone plus hydroperoxide, introduced as bubble coating, 30-minute bench-scale test.

| Compound | Initial Concentration (µg/kg) | Ozone + Hydroperoxide | | % Removal |
|---|---|---|---|---|
| | | 300 ppmv + 10 ml 10% | 3000 ppmv + 30 ml 10% | |
| Acenaphthylene | 15,000 | BRL | BRL | 99 |
| Benzo(a)anthracene | 18,000 | 5,800 | 2,400 | 86 |
| Benzo(b)fluoranthene | 17,000 | 5,800 | 3,100 | 82 |
| Benzo(k)fluoranthene | 17,000 | 5,400 | 2,700 | 84 |
| Dibenzo(a,h)anthracene | 17,000 | 4,900 | 2,300 | 86 |
| Indo(1,2,3-c,d)pyrene | 18,000 | 5,100 | 2,300 | 87 |
| Phenanthracene | 17,000 | 4,200 | 2,000 | 87 |
| Pyrene | 40,000 | 13,000 | 5,500 | 86 |

Field Operations and Implementation

The process of administration of the liquid and gas would be in-situ, with use of laminar diffusers (e.g., Sparge-points®). FIG. 1 presents a schematic diagram of the K-V Associates Criegee oxidizer with simultaneous liquid and gas supply. The individual diffusers (e.g., Spargepoints®) are drilled into the contaminated aquifer region to be treated. The timer-controller delivers liquid and gas simultaneously. The number of diffusers (e.g., Spargepoints®) depend upon the volume to be treated. The microbubble operating system is used to field treat about 1 cubic meter of saturated soil contained in a plastic trash bin runs on house current (120 volts AC, 15 amp).

The reactivity of ozone with benzene, phenanthrene, naphthalene, pyrene, and chrysene is well-documented in the scientific literature. Old diesel fuel or coal tar residues often contain these compounds. Not uncommonly, PCBs are encountered with these organics, presenting a difficult mix to remediate. The bench test of the coated microbubbles resulted in a removal varying from 79% to 99% for the mixture of PAHs and PCBs, with initial oxidant treatment. For the arochlor example (See, Table 5), this corresponds to remediation from about 23,300 µg/kg initial concentration to about 3,900 µg/kg upon initial oxidant treatment. Switching to nutribubble injection can be successful in bringing the total removal rate to less than 10 µg/kg of treated soil. Representative results are delineated in Table 4. The designation "below reportable levels" (BRL) signifies that concentrations were below those detectable according to the analytical techniques and instrumentation used.

TABLE 5

Removal of HVOCs (PCE and TCE), PCBs (Arochlor 1016), and PAHs (Nitrobenzene, Phenanthrene, Anthacene, and Pyrene) in Contaminated Soil During Pilot Test with Hydroperoxide-Thickened Microbubbles (Concentrations in ppb-µg/kg (Soil) or µg/L (Water))

| | Pilot Test | | | | | | |
|---|---|---|---|---|---|---|---|
| | Test 1 Air-Sparge Only | | Test 2 Air/Ozone (500 ppmv) .7 cfm Run Minutes | | Test 3 Air/Ozone/ Hydroperoxide (500 ppmv)/12% solution .7 cfm/6 cc/min | | |
| | 0 | 120 | 0 | 120 | 0 | 60 | 240 |
| TCE GW Soil | 1900 79 | 150 BRL | 1,,200 50 | 60 BRL | 8100 870 | 210 — | BRL BRL |
| PCE GW Soil | 1,400 64 | 110 BRL | 510 56 | 34 50 | 4,000 480 | 86 — | 12 BRL |
| Nitrobenzene (Soil) | — | — | — | — | 6,000 | 4,300 | 2,100 |
| Phenanthrene (Soil) | — | — | — | — | 8,800 | 7,500 | 7,100 |
| Anthracene (Soil) | — | — | — | — | 11,000 | 9,000 | 8,400 |
| Pyrene (Soil) | — | — | — | — | 10,000 | 10,000 | 9,000 |
| Arochlor 1016 (PCB) (Soil) | — | — | — | — | 2,900 | 1,400 | 1,100 |

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for remediating a contaminated area including one or more gases comprising:
   an injection well;
   a source of a liquid suitable for promoting biological degradation of organic compounds;
   a source for delivering a gas including an oxidizing gaseous agent;
   an aerosolizer for aerosolizing the liquid;
   a microporous diffuser disposed in the well for generating coated microbubbles of a controlled size comprising the gas in the microbubbles and a liquid coating surrounding the gas.

2. The apparatus of claim 1, wherein the microporous diffuser provides microbubbles having a diameter of less than 200 microns.

3. The apparatus of claim 1, further comprising:
   a controller for controlling the ratio of gas and liquid in generating the coated microbubble.

4. The apparatus of claim 1, further comprising:
   a controller for controlling mixing of ambient air with said liquids.

5. The apparatus of claim 1, further comprising:
   an agitator to pulse or surge the microbubbles into the well to improve transport of coated microbubbles through the contaminated area.

6. The apparatus of claim 5 wherein the agitator comprises a submersible pump.

7. The apparatus of claim 1 wherein the liquid is selected from the group consisting of hydroperoxides, potassium permanganate, and Fenton reaction reagents.

8. The apparatus of claim 4, wherein the controller for controlling mixing comprises:
   a wellhead controller for equalizing flow between formations of differing permeability.

9. The apparatus of claim 5 wherein the agitator alternates pumping of water and delivery of coated microbubble injection.

10. The apparatus of claim 1 wherein the liquid is hydrogen peroxide, or an intermediate by-product of decomposition of ozone and an organic compound, the intermediate by-product including formic peracid, acetic peracid, hydroxymethylhydroperoxide, or 2-hydroxy-2-propyl hydroperoxide, and the gaseous oxidizing includes ozone in sufficient quantities to decontaminate contaminates in the contaminated area.

* * * * *